United States Patent
Rastogi

(10) Patent No.: US 11,263,667 B1
(45) Date of Patent: Mar. 1, 2022

(54) SCORING OF CONTENT ITEMS HAVING A MESSAGING APPLICATION AS A LANDING PAGE

(71) Applicant: Facebook, Inc., Menlo Park, CA (US)

(72) Inventor: Vibhor Rastogi, San Carlos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/929,096

(22) Filed: Jul. 14, 2020

Related U.S. Application Data

(60) Provisional application No. 62/881,265, filed on Jul. 31, 2019.

(51) Int. Cl.

| | |
|---|---|
| *G06Q 30/02* | (2012.01) |
| *G06F 16/9535* | (2019.01) |
| *G06F 16/955* | (2019.01) |
| *G06F 16/9538* | (2019.01) |
| *G06N 20/00* | (2019.01) |
| *G06N 5/04* | (2006.01) |
| *H04L 51/046* | (2022.01) |

(Continued)

(52) U.S. Cl.
CPC ..... *G06Q 30/0269* (2013.01); *G06F 16/9535* (2019.01); *G06F 16/9538* (2019.01); *G06F 16/9558* (2019.01); *G06N 5/04* (2013.01); *G06N 20/00* (2019.01); *G06Q 30/0255* (2013.01); *G06Q 30/0257* (2013.01); *G06Q 30/0275* (2013.01); *G06Q 30/0277* (2013.01); *H04L 51/046* (2013.01); *H04L 67/22* (2013.01); *H04L 67/306* (2013.01)

(58) Field of Classification Search
CPC .......... G06Q 30/0269; G06Q 30/0255; G06Q 30/0257; G06N 5/04; H04L 51/046; H04L 67/22
See application file for complete search history.

(56) References Cited

U.S. PATENT DOCUMENTS

| | | | |
|---|---|---|---|
| 2009/0125585 A1* | 5/2009 | Krishnaswamy | H04L 67/22 709/203 |
| 2016/0171540 A1* | 6/2016 | Mangipudi | G06Q 30/0255 705/14.53 |

(Continued)

FOREIGN PATENT DOCUMENTS

| | | | | |
|---|---|---|---|---|
| EP | 3076608 A1 | * | 10/2016 | ............. H04L 51/16 |
| GB | 2507667 A | * | 5/2014 | ......... G06Q 30/0255 |

*Primary Examiner* — Scott C Anderson
(74) *Attorney, Agent, or Firm* — Fenwick & West LLP

(57) ABSTRACT

An online system receives a content item from a content provider, the content item having a bid price and including a link to a messaging application. The link is configured to initiate a direct message in the messaging application between the content provider and a user who interacts with the content item. The online system receives a request for content items from a target user and determines a compatibility score between the target user and the content item based on one or more sets of criteria. A first set of criteria indicates a compatibility between the user and the messaging application. The online system determines a subsidy for the content item based on the compatibility score. The online system adjusts the bid price with the determined subsidy to determine an auction price and includes the content item with the auction price in a selection process for presentation to the user of the online system.

20 Claims, 5 Drawing Sheets

(51) Int. Cl.
*H04L 67/50* (2022.01)
*H04L 67/306* (2022.01)

(56) References Cited

U.S. PATENT DOCUMENTS

| | | | |
|---|---|---|---|
| 2016/0379250 A1* | 12/2016 | Bhalgat | G06Q 30/0255 |
| | | | 705/14.53 |
| 2017/0149704 A1* | 5/2017 | Batiz | G06Q 30/08 |
| 2019/0124021 A1* | 4/2019 | DeMattei | G06F 3/0488 |
| 2020/0097560 A1* | 3/2020 | Kulkarni | G06Q 30/0201 |

* cited by examiner

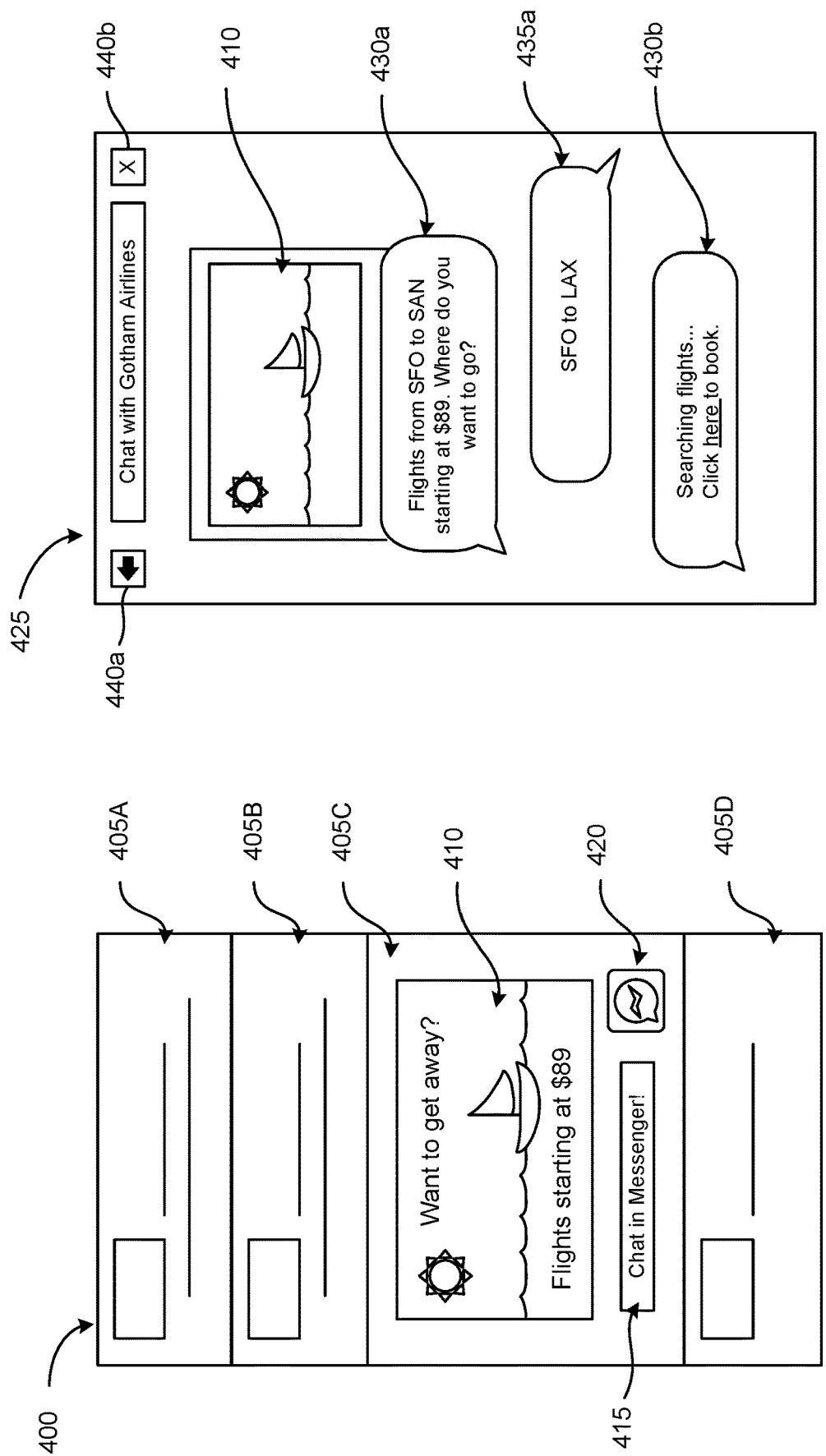

US 11,263,667 B1

SCORING OF CONTENT ITEMS HAVING A MESSAGING APPLICATION AS A LANDING PAGE

CROSS REFERENCE TO RELATED APPLICATIONS

This application claims the benefit of U.S. Provisional Application No. 62/881,265, filed Jul. 31, 2019, which is incorporated by reference in its entirety.

BACKGROUND

This disclosure relates generally to determining a compatibility score for a user and an advertisement, in particular for an advertisement that includes a link to a messaging application.

Some advertisements attempt to engage a user by including a link to a browser, an application, a pop-up window, etc. In a specific example, an advertisement includes a link to a messaging application. Responsive to a user interacting with the advertisement, a server initiates a direct message between the advertiser and the user in the messaging application. These types of advertisements allow the advertiser to engage with an individual user, but they can be costly and impractical to implement. These types of advertisements often use a human moderator to monitor the advertiser account 24 hours a day in order to live chat with users via the messaging application. Alternatively, a computerized bot may monitor the advertiser account, but it may be difficult to train the bot to effectively engage with a user. Furthermore, a user may be concerned with privacy when engaging with an advertiser via a messaging application as the online system may monitor the certain aspects of the communication between the user and the advertiser to gather data regarding whether the communication was successful (e.g., whether the communication resulted in a conversion). Accordingly, a system that protects user privacy and allows advertisers to more effectively engage with users is needed.

SUMMARY

A system and method for determining compatibility between a user and an advertisement. An online system receives an advertisement ("ad") from an advertiser, the ad having a bid price and including a link to a messaging application. The link is configured to initiate a direct message in the messaging application between the advertiser and a user who interacts with the ad. The online system receives an ad request from a target user and determines a compatibility score for the advertisement and the target user based on one or more sets of criteria, including a first set of criteria indicating compatibility between the target user and the messaging application. The compatibility score can be based on characteristics of the target user (e.g., gender, location), historical interaction between the target user and the messaging application, feedback from one or more users of the online system related to the messaging application, etc. Additional criteria in the one or more sets of criteria can indicate a compatibility between the target user and the advertisement (e.g., based on past interaction of the target user with similar content) and/or between the target user and the advertiser (e.g., based on purchasing habits of the target user). In some embodiments, the compatibility score is a likelihood of deep conversation, where the likelihood of deep conversation is a likelihood that the target user and the advertiser will exchange at least three messages in the messaging application. The online system determines a subsidy for the ad based on the compatibility score. The online system determines an auction price for the ad by adjusting the bid price with the determined subsidy and includes the ad with the auction price in a selection process for presentation to the user of the online system.

BRIEF DESCRIPTION OF THE DRAWINGS

FIG. 4A illustrates an example user interface including an advertisement, in accordance with an embodiment.

FIG. 4B illustrates a first example direct message interface, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
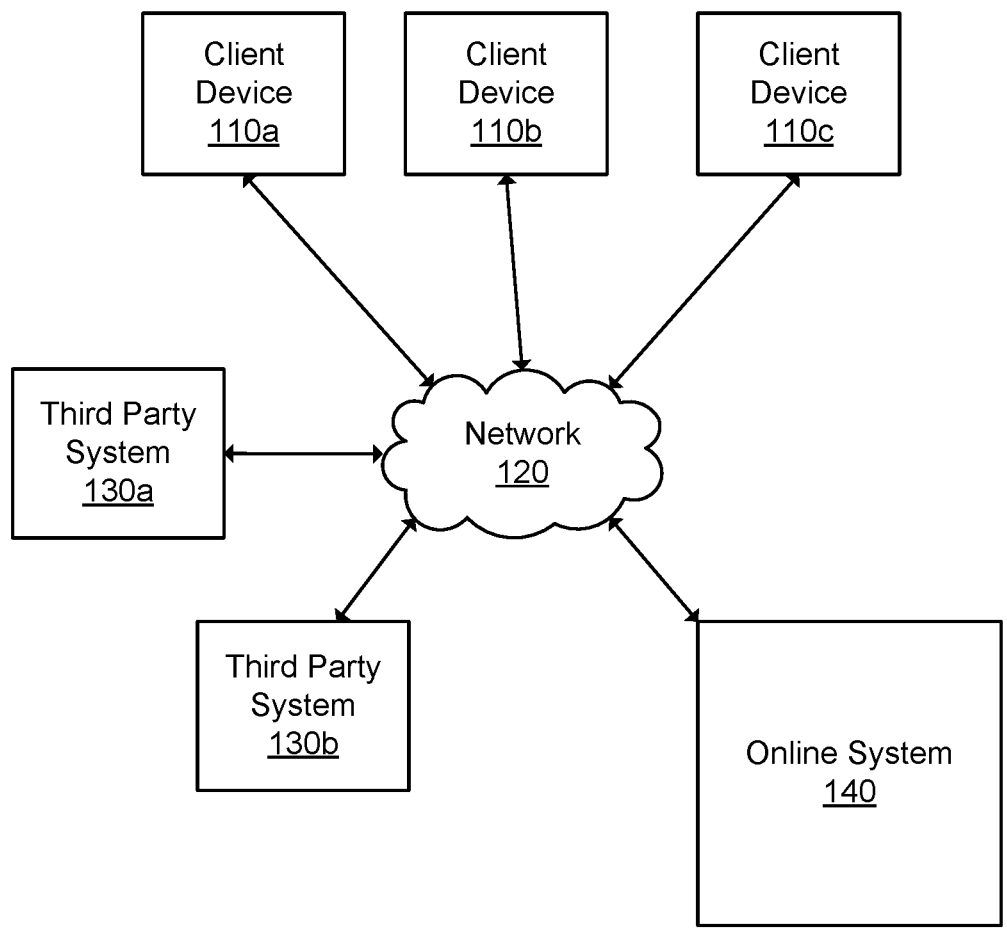
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In the embodiment of FIG. 1 there are three client devices 110, but in other embodiments there may a greater or fewer number of devices.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. In one embodiment, the third party system 130 is an advertiser. A third party system 130 may also communicate information to the online system 140, such as advertisements, content, or information about an application provided by the third party system 130.

Figure 2:
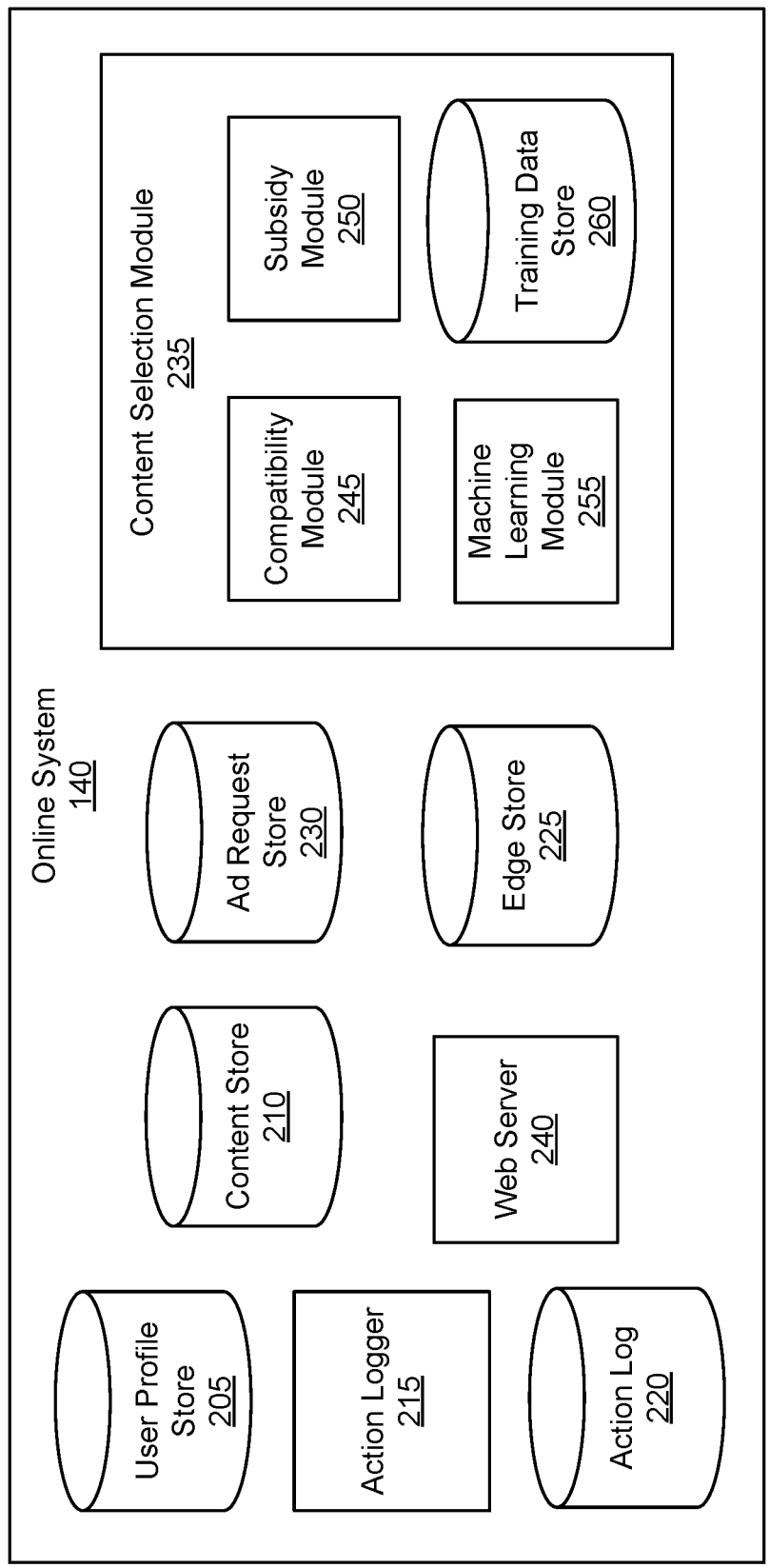
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a content selection module 235, a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210 or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may include content items associated with bid amounts. The content selection module 235 uses the bid amounts associated with content items when selecting content for presentation to the user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount and a likelihood of the user interacting with the content item.

In some embodiments, the interaction of the user with the content item includes sending messages through a messaging application. That is, the content item may redirect the user to a messaging application to initiate a messaging thread using the messaging application. For example, clicking a content item can cause a messaging application installed in a mobile device of a user to load and open a new messaging thread between the user and the advertiser.

For content items having a specified interaction of a communication between the user and an advertiser through a messaging app, a compatibility module 245 of the content selection module determines a compatibility score between a user and an advertisement including a link to a messaging application based on one or more sets of criteria. The compatibility module 245 can evaluate information stored by the user profile store 205, edge store 225, and action log 220 to determine a likelihood of user interaction with an advertiser (e.g., a third party system 130) in the messaging application. In some embodiments, the compatibility score is a likelihood of deep conversation. Described herein, deep conversation is defined as an exchange of three or more messages between two or more entities associated with the online system 140 (e.g., a user and an advertiser). The compatibility module 245 is described in greater detail below in relation to FIG. 3.

The machine learning module 255 applies machine learning techniques to train the compatibility module 245 configured for determining a compatibility score between an advertisement and a user. The machine learning module 255 uses training data and features stored in the training data store 260, user profile store 205, content store 210, edge store 225 and action log 220. In one embodiment, the machine learning module 255 retrieves, from the training data store 260, content items (e.g., advertisements) to train the compatibility module 245 using various machine learning techniques.

In an embodiment, the compatibility module 245 generates compatibility scores for content items for a user of the online system 140 when a request to provide a content item to the user is received. The compatibility module 245 generates the compatibility scores based on user compatibility with a messaging application, an advertiser, an advertisement, or some combination thereof. In one embodiment, the machine learning module 255 periodically retrains (e.g., using the training data store 260) the compatibility module 245 at a determined frequency of time. The frequency of time may be based on information from the client device 110 such as the average time a user engages with news feed stories of the online system 140 on the client device 110 each day.

In an embodiment where the compatibility score indicates a likelihood of deep conversation, as part of the generation of the compatibility module 245, the machine learning module 255 forms a training set of advertisements, each advertisement including a link to a messaging application, by identifying a positive training set of advertisements that have yielded deep conversation between the user and an advertiser and, in some embodiments, forms a negative training set of content items that do not yield deep conversation. In alternative embodiments, the machine learning module 255 trains the compatibility module 245 using training sets of advertisements that have a compatibility score above or below a threshold.

The machine learning module 255 extracts feature values from the advertisements of the training set, the features being variables deemed potentially relevant to whether or not the advertisements yield deep conversation. Specifically, the feature values extracted by the machine learning module 255 include which messaging application is included in the advertisement, the type of advertisement, the type of creatives in the advertisement, the advertiser associated with the advertisement, and any other suitable features. An ordered list of the features for a content item is herein referred to as the feature vector for the advertisement. In one embodiment, the machine learning module 255 applies dimensionality reduction (e.g., via linear discriminant analysis (LDA), principle component analysis (PCA), or the like) to reduce the amount of data in the feature vectors for advertisement to a smaller, more representative set of data.

The machine learning module 255 uses supervised machine learning to train the compatibility module 245 with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning module 255, when applied to the feature vector extracted from an advertisement, outputs an indication of whether the content item has the property in question, such as a Boolean yes/no estimate, or a scalar value representing a probability.

In some embodiments, a validation set is formed of additional advertisements, other than those in the training sets, which have already been determined to generate deep conversation. The machine learning module 255 applies the trained validation compatibility module 245 to the advertisements of the validation set to quantify the accuracy of the compatibility module 245. Common metrics applied in accuracy measurement include: Precision=TP/(TP+FP) and Recall=TP/(TP+FN), where precision is how many the compatibility module 245 correctly predicted (TP or true positives) out of the total it predicted (TP+FP or false positives), and recall is how many the compatibility module 245 correctly predicted (TP) out of the total number of advertisements that did yield deep conversation (TP+FN or false negatives). The F score (F-score=2*PR/(P+R)) unifies precision and recall into a single measure. In one embodiment, the machine learning module 255 iteratively re-trains the compatibility module 245 until the occurrence of a stopping condition, such as the accuracy measurement indication that the model is sufficiently accurate, or a number of training rounds having taken place.

The content selection module 235 may rank content items based on their associated bid amounts and select content items having at least a threshold position in the ranking for presentation to the user. In some embodiments, the content selection module 235 ranks both content items not associated with bid amounts and content items associated with bid amounts in a unified ranking based on bid amounts and measures of relevance associated with content items. Based on the unified ranking, the content selection module 235 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For content items having a specified interaction of a communication between the user and an advertiser through a messaging app, a subsidy module 250 of the content selection module 235 determines a subsidy based on the compatibility score determined by the compatibility module 245. The subsidy may be a function of the compatibility score. In one embodiment, the subsidy module 250 adjusts the bid price upwards or downwards during an ad campaign if the ad campaign is paced. A paced ad campaign increases or decreases the bid for the ad campaign to spend the budget for the campaign evenly during the length of the campaign. The subsidy module 250 further determines an auction price for the ad. The auction for the ad is the determined bid price plus the determined amount of subsidy. The auction price is used when comparing the ad to other ads for an impression opportunity. For example, for the impression opportunity, the ads are compared based in part on their auction prices to select an ad to present. Advertisement bidding is further described in U.S. patent application Ser. No. 13/294,094 entitled "Budget-Based Bidding in a Social Networking System," filed on Nov. 10, 2011, and is incorporated by reference in its entirety. In one embodiment, the subsidy module 250 increases the likelihood that an advertisement is selected for presentation to a user.

For example, the content selection module 235 receives a request to present a feed of content to a user of the online system 140. The feed may include one or more content items associated with bid amounts and other content items, such as stories describing actions associated with other online system users connected to the user, which are not associated with bid amounts. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 235 to identify candidate content items eligible for presentation to the user. For example, content items associated with users who are not connected to the user or stories associated with users for whom the user has less than a threshold affinity are discarded as candidate content items. Based on various criteria, the content selection module 235 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 235 presents content to a user through a newsfeed including a plurality of content items selected for presentation to the user. One or more content items may also be included in the feed. An example feed is shown in FIG. 4A and described in greater detail below. The content selection module 235 may also determine the order in which selected content items are presented via the feed. For example, the content selection module 235 orders content items in the feed based on likelihoods of the user interacting with various content items.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In the embodiment of FIG. 2, the action log 220 may store information related to historical interaction of the user with one or more applications accessed by the user via a client device 110. In particular, the action log 220 can store information related to user interaction with one or more messaging applications (e.g., Facebook Messenger, Whatsapp, Instagram). The action log 220 can store information related to a number of times the user accesses a messaging application (e.g., per day, per week), an amount of time spent on a messaging application, a number of messages exchanged within a messaging application (e.g., per day, per hour), other users that the user interacts with via a messaging application, and any other additional details related to user interaction with a messaging application.

In some embodiments, the action log 220 receives the information directly from the messaging application. That is, the messaging application sends a notification to the online system 140 when a user accesses the messaging application. For privacy reasons, the online system 140 may not keep track of the people user sent messages to or the messages sent by the user.

In some embodiments, the messages sent through the messaging application are encrypted. Here, the messaging application or the online system 140 can determine which user sent the message and when the message was sent (e.g., by identifying the source of the message and the time the message was received), but the messaging application and the online system 140 are not able to decrypt the messages. Instead, the messaging application routes the message to the recipient, who then is capable of decrypting the message. As such, the online system 140 is able to determine that the user has interacted with the messaging application but the sensitive information is kept out of the reach of the online system 140.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the online system 140 uses a tracking pixel or piece of HTML code placed by the third party system 130 on third party websites to monitor users visiting the websites that have not opted out of tracking. A tracking pixel might be included on various pages, including on a product page describing a product, on a shopping cart page that the user visits upon putting something into a shopping cart, on a checkout page that the user visits to checkout and purchase a product, etc. For example, a tracking pixel results in a transparent 1×1 image, an iframe, or other suitable object being created for third party pages. When a user's browser loads a page having the tracking pixel, the tracking pixel results in the user's browser attempting to retrieve the content for that pixel, and the browser contacts the online system 140 to retrieve the content. The request sent to the online system 140, however, actually includes various data about the user's actions taken on the third party website. The third party website can control what data is sent to the online system 140. For example, the third party system 130 may include information about the page the user is loading (e.g., is it a product page, a shopping cart page, a checkout page, etc.), about information on the page or about a product on the page of interest to the user (e.g., the SKU number of the product, the color, the size, the style, the current price, any discounts offered, the number of products requested, etc.), about the user (e.g., the third party's user identifier (UID) for the user, contact information for the user, etc.), and other data. In some embodiments, a cookie set by the online system 140 can also be retrieved by the online system, which can include various data about the user, such as the online systems' UID for the user, information about the client device and the browser, such as the Internet Protocol (IP) address of the client device, among other data. Tracking can also be performed on mobile applications of content providers by using a software development kit (SDK) of the online system or via an application programming interface (API) of the online system to track events (e.g., purchases) that occur by users on the content provider's app that are reported to the online system.

The online system 140 can then use this data received about the user to serve better content to the user in the future (e.g., since the online system has further data about products purchased or browsed that might be of interest), and can also use this in retargeting of that product to the user (e.g., where the user went to the product page on the third party site by clicking on an of the third party presented to the user in the online system). The online system can also use this data in conversion tracking and reporting results of advertising campaigns to the third party. For example, if the third party has spent money at the online system 140 to have the online system 140 serve ads for its products, and a particular user views an ad on the online system and then purchases the product advertised (possibly at some point later, and possibly on a different device), the online system 140 can link the purchase/conversion to the ad originally shown on the online system 140. Thus, the online system 140 can include this data in its reporting to the third party system of how many conversions the ad campaign received.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The ad request store 230 stores information describing ad campaigns received from one or more third party systems 130. Each ad campaign includes one or more ads described by ad requests, so the ad request store 230 also includes information describing various ad requests comprising ad campaigns. An ad campaign is associated with a set of delivery parameters (e.g., a budget, impression goal, a target average price paid, etc.) Additionally, an ad campaign may be associated with one or more objectives and a duration.

A target average price paid represents an amount of compensation an advertiser desires to pay the online system 140 per action associated with ads in the ad campaign. For example, the target average price paid specifies an average amount of compensation the advertiser seeks to provide the online system 140 for each presentation of an ad in the ad campaign to an online system user (an "impression") or for each conversion event associated with an ad from the ad campaign presented to an online system user (e.g., an interaction with an ad, an interaction with an object associated with an ad, etc.).

The budget represents a total amount of revenue an advertiser has allocated to compensate the online system 140 for presenting ads in an ad campaign. An amount is deducted from the budget each time an ad from an ad campaign is presented and an action associated with the ad by an advertiser occurs (e.g., an impression of an ad, a conversion event associated with the ad). When the budget is exhausted, the online system 140 ceases presentation of ads from an ad campaign associated with the budget.

An objective associated with an ad campaign describes one or more goals for actions associated with the ad campaign. For example, an objective specifies a total number of impressions of ads in the ad campaign to online system users (an "impression objective"), specifies a total number of unique online system users to be presented with at least one ad from the ad campaign (a "reach objective"), a number of times an ad from the ad campaign is presented to an online system user (a "frequency objective"), or any other suitable criteria. Additionally, the duration associated with the ad campaign specifies a time interval during which ads from the ad campaign are presented to online system users. For example, if the duration of an ad campaign is 30 days, ads included in the ad campaign are presented to online system users for 30 days after the ad campaign is provide to the online system 140 or until the budget is exhausted. In some embodiments, the advertiser specifies a start date for the ad campaign, so the duration is measured from the specified start date.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Method of Determining a Compatibility Score

Figure 3:
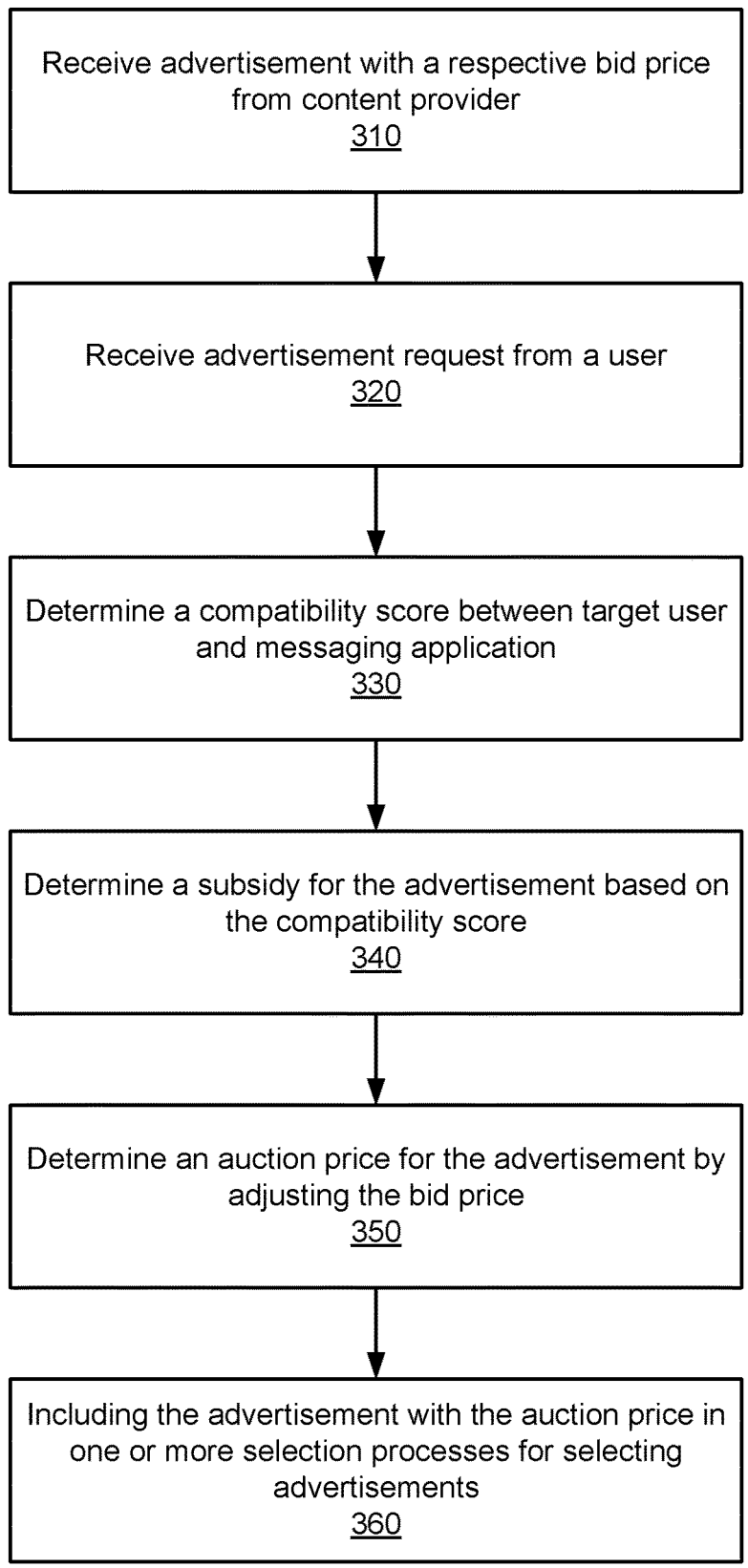
FIG. 3 is a flow chart illustrating a method of determining a compatibility score for an advertisement, in accordance with one or more embodiments.

FIG. 3 illustrates a method of determining a compatibility score, in accordance with one embodiment. The steps shown in FIG. 3 are performed by one or more components of the online system 140 shown in FIG. 2 (e.g., action logger 215, content selection module 235). The steps can be performed in a different order, or may be performed by different entities than described herein. Additionally, the method 300 can include different or additional steps than described below.

The online system 140 receives 310 an advertisement ("ad") with a respective bid price. The online system 140 may receive the advertisement from a third party system 130 (e.g., an advertiser). The advertisement can include one or more creatives, where the creatives may include text, images, hyperlinks, videos, interactive content, and/or any other suitable content as shown below in FIG. 4A. In one embodiment, the advertisement includes a link configured to direct a user to a messaging application. The messaging application included in the advertisement is selected by the third party system 130. In other embodiments, the messaging application may be selected by the online system 140, by the user of the client device 110, or by any other suitable component. In some embodiments, the third party system 130 identifies the messaging applications that are supported by the third party system 130, and the online system 140 selects one of the supported messaging applications before the advertisement is provided to the user based on information associated with the user. The link included in the advertisement is configured to initiate a direct message between the user and the advertiser in the messaging application. The direct message allows the advertiser to engage in a discussion with an individual user, promoting user engagement and enhancing user experience. The messaging application may be an application installed on a client device 110, a messaging window in a web browser, a pop-up window, or any other suitable interface. In other embodiments, the messaging application may be an application associated with a particular online system 140.

The online system 140 receives 320 an advertisement request from a client device 110. A user viewing a content feed on the client device 110, described below in relation to FIG. 4A, may generate a request for an advertisement as the user scrolls through the feed. The online system 140 can use information stored in the user profile store 205, the action log 220, and the edge store 225 to identify one or more advertisements for presentation to the user in response to the advertisement request. Each advertisement may include a respective bid amount, as described above in relation to FIG. 2. In some embodiments, the online system 140 may determine whether the user satisfies targeting criteria associated with one or more advertisements.

The compatibility module 245 determines 330 a compatibility score between the user and an advertisement based on one or more sets of criteria. The compatibility score can represent a likelihood of user interaction with the advertiser in the messaging application. In one embodiment, as described above, the compatibility score represents a likelihood of deep conversation. The compatibility module 245 can determine the compatibility score based on information stored in the edge store 225, action log 220, and the user profile store 205, described below.

In on embodiment, the compatibility module 245 first determines whether the messaging application is installed on the client device 110 of the user. If the messaging application is not installed on the client device 110, the compatibility module 245 may determine the compatibility score is zero (i.e. likelihood of user interaction with the messaging application is zero). If the application is installed on the client device 110, the compatibility module 245 determines the compatibility score based on one or more sets of criteria. A first set of criteria indicates a level of compatibility between the user and the messaging application included in the advertisement. The first set of criteria can include historical trends of user interaction with the messaging application (e.g., time spent on the messaging application, a number of messages exchanged on the messaging application over a period of time), characteristics of the user (e.g., geographic location of a user, gender), interactions of additional users of the online system 140 with the messaging application, user feedback (e.g., user rating of the application), etc. The first set of criteria can include any additional information related to a likelihood of user interaction with a messaging application. In one embodiment, the compatibility score is a likelihood of deep conversation, i.e., a likelihood that a user and an advertiser will exchange at least three messages in the direct message interface. As such, the first set of criteria can include historical trends of deep conversation in the messaging application (e.g., between the user and other users, between the user and an advertiser, between other users associated with the user and the advertiser, etc.). In one embodiment, the compatibility module 245 weights the first set of criteria to generate a first weighted score.

The compatibility can additionally or alternatively analyze a second set of criteria may indicating a level of compatibility between the user and the advertiser. The second set of criteria can include historical interaction between the user and the advertiser (e.g., a number of times the user has interacted with advertisements provided by the advertiser), explicit user preference for the advertiser (e.g., the user has liked advertiser's page on the online system 140), implicit user preference for the advertiser, user purchasing history related to the advertiser, etc. The criteria can include any additional features indicating preferences of the user related to the advertiser. In one embodiment, the computability module 245 weights the second set of criteria to generate a second weighted score.

The compatibility module 245 can evaluate a third set of criteria indicating a level of compatibility between the user and the advertisement. The third set of criteria can include determining whether the user satisfies targeting criteria (e.g., age, gender, location) associated with the advertisement, historical interaction between the user and different types of advertisements (e.g., videos, interactive content, images), etc. The third set of criteria can include any other information related to a likelihood of a user interacting with the advertisement. In one embodiment, the compatibility module 245 weights the third set of criteria to generate a third weighted score.

The compatibility module 245 can generate a compatibility score based on the first set of criteria, the second set of criteria, the third set of criteria, or some combination thereof. In some embodiments, the compatibility module 245 generates a weighted compatibility score based on the one or more sets of criteria or one or more of the first, second, and third weighted scores. In other embodiments, the compatibility module 245 can generate a compatibility score based on additional criteria not described herein. In some embodiments, the compatibility module 345 compares the compatibility score to a threshold to determine whether deep conversation is likely or unlikely. For example, if the compatibility score is greater than the threshold, the compatibility module 245 determines that deep conversation is likely, and if the compatibility score is less than the threshold, deep conversation is unlikely. In other embodiments, the compatibility score is a likelihood of deep conversation (e.g., on a non-binary scale).

The subsidy module 250 determines 340 a subsidy for the ad based on the compatibility score. The online system 140 subsidizes the ad to promote content that may be desirable for users of the online system 140 and encourage engagement between the user and the advertiser (e.g., in the messaging application). The subsidy increases the advertiser's chance of winning an ad auction to present an ad to present such content that may be desirable for users to view. For example, for a higher compatibility score, the subsidy module 250 determines a higher subsidy, such that the advertisement is more likely to be selected for presentation to the user. For lower compatibility scores, the subsidy module 250 may determine a smaller subsidy or no subsidy at all. In other embodiments, the subsidy may act as a reduction of the cost incurred to the third party system 130. The online system 140 can determine the subsidy as a function of the compatibility score. In one embodiment, the subsidy is the monetary value associated with the user multiplied by the function of the compatibility score. The monetary value of the user may be related to user interaction with the online system 140 (e.g., click rate).

The online system 140 can determine 340 an auction price by adjusting the bid price with the determined subsidy. In some embodiments, the online system 140 computes the auction price by adding the bid price and the subsidy. If the compatibility score is zero, the auction price may be equal to the bid price. The online system 140 includes 350 the advertisement and the determined auction price in one or more selection processors for selecting advertisements. The selection processes may select one or more advertisements with the highest auction price. Thus, reducing the auction price increases the likelihood that an ad for which a user is more likely to interact with an advertiser in a messaging application is selected, enhancing user and advertiser interaction. In one embodiment, the online system 140 selects the advertisement including the link to the messaging application for presentation to the user.

The online system 140 may track the user response (e.g., user interaction with the advertiser in the messaging application) and add the advertisement to one or more training sets to train the compatibility module 245, as described above in relation to FIG. 2. The online system 140 tracks the user response in a manner that protects privacy of the user (e.g., such that the content of the messages is not available the online system 140). The messages between the user and the advertiser in the messaging application are encrypted such that the online system 140 cannot decipher the information exchanged in the messages. The online system 140 may be able to determine when a message was sent by the user or the advertiser (e.g., by a notification from the messaging application), but the online system 140 cannot see the content of the messages. Thus, the online system 140 can count a number of messages exchanged between the user and the advertiser to determine whether deep conversation occurred without breaching user privacy.

The online system 140 may use the tracked user response information to determine whether a deep conversation occurred. For example, the tracked user response information is used to further train the compatibility module 245. If the online system 140 determines that a deep conversation occurred, the advertisement impression is stored in the training data store 260 as a positive training sample. Conversely, if the online system 140 determines that a deep conversation did not occur (e.g., if the online system 140 does not receive at least three encrypted messages from the user to the advertiser within a specified time period), the advertisement impression is stored in the training data store 260 as a negative training sample.

In some embodiments, the online system 140 identifies whether three rounds of back and forth messages were sent. That is, the online system 140 determines if the user sent a message to the advertiser after the advertiser had sent a message to the user three times. For instance, the online system 140 may increase the value of a counter when the online system determines that a user has sent a message to the advertiser after the advertiser had sent a message to the user. If the counter for a conversation reaches a value of three or more within a predefined time period, the online system 140 identifies the conversation as a deep conversation.

In some embodiments, the tracked user response information is further used to determine a payment amount from the advertiser to the online system 140 for presenting the advertisement to the user. For example, the online system may only charge the advertiser if a deep conversation occurred between a user and the advertiser. The tracked user response information is then used to determine if the advertiser will be charged for a specific ad impression. If the online system 140 determines that a deep conversation occurred, the advertiser is charged a fee that is determined based on the bid amount specified by the advertiser when creating the ad campaign.

In some embodiments, to increase the privacy of the user, the online system 140 only stores an identification of whether an ad impression resulted in a deep conversation. The online system 140 may not store the number of messages or the time the messages were received. Moreover, since the online system 140 does not have access to the content of the messages, the online system 140 does not store any information regarding the content of the messages sent by the user or by the advertiser.

Example User Interface

FIG. 4A illustrates an example content feed, in accordance with one or more embodiments. The online system 140 provides one or more content items (e.g., 405A, 405B, 405C, 405D) to a user via a content feed 400. The content items 405 can be sponsored content (e.g., advertisements), organic content, or any other type of content. The content items 405 may be provided by a third party system 130, another user, may be generated by the online system 140, or provided by any other suitable source. In the embodiment of FIG. 4A, a third party system 130 (e.g., an advertiser) provides the content item 405C (e.g., an advertisement). The content item 405C includes a plurality of creatives 410, 415, and 420. The creative 410 includes an image and text associated with vacation. The creative 415 includes an indication that the user can chat with the advertiser in a messaging application (e.g., Messenger). The creative 420 includes the logo of the messaging application (e.g., Messenger logo). In some embodiments, one or more of the creatives includes a hyperlink to an external application. For example, responsive to the user clicking on the creative 420, the content item 405C can direct the user to a direct message interface in the messaging application associated with the logo. In some embodiments, the link is a deep link that opens the messaging application in a specific state to enable the user to directly communicate with the third party system. In other embodiments, the user may be directed to a direct message interface responsive to selecting creative 410 or 415, or the user can select anywhere within the content item 405C.

Responsive to interacting with the content item 405C (e.g., clicking on the content item 405C), the user may be directed to a direct message interface illustrated in FIG. 4B. The third party system 130 (e.g., Gotham Airlines) can initiate a conversation between the user the advertiser. In the example of FIG. 4B, the third party system 130 sends a message including one or more creatives (e.g., creative 410) of the content item 405C. The third party system 130 can send additional content or text with the creative 410, such as the message 430a. The message 430a requests information from the user. The user may respond with a message 435a providing the information to the advertiser. In other embodiments, the user may respond with a message that does not satisfy the information requested by the third party system 130. The third party system 130 can follow up with another message to continue engaging the user. Alternatively, the third party system 130 can provide a message 430b with a link to a website associated with the third party system 130. The link may be configured to direct the user to a browser where a user can complete a purchase, browse an advertiser's website, etc. Alternatively, responsive to the user selecting a return button 440a, the user can be directed back to the content feed 400. Alternatively, responsive to the user selecting a close button 440b, the user can be directed to another interface in the messaging application. In the embodiment shown, the success of the advertisement may be measured based on a level of user interaction with the advertiser in the messaging application (e.g., how many messages are exchanged, whether the user clicks on the provided link, whether the user completes a purchase on the link, whether the user closes the messaging application, etc.).

Figure 4C:
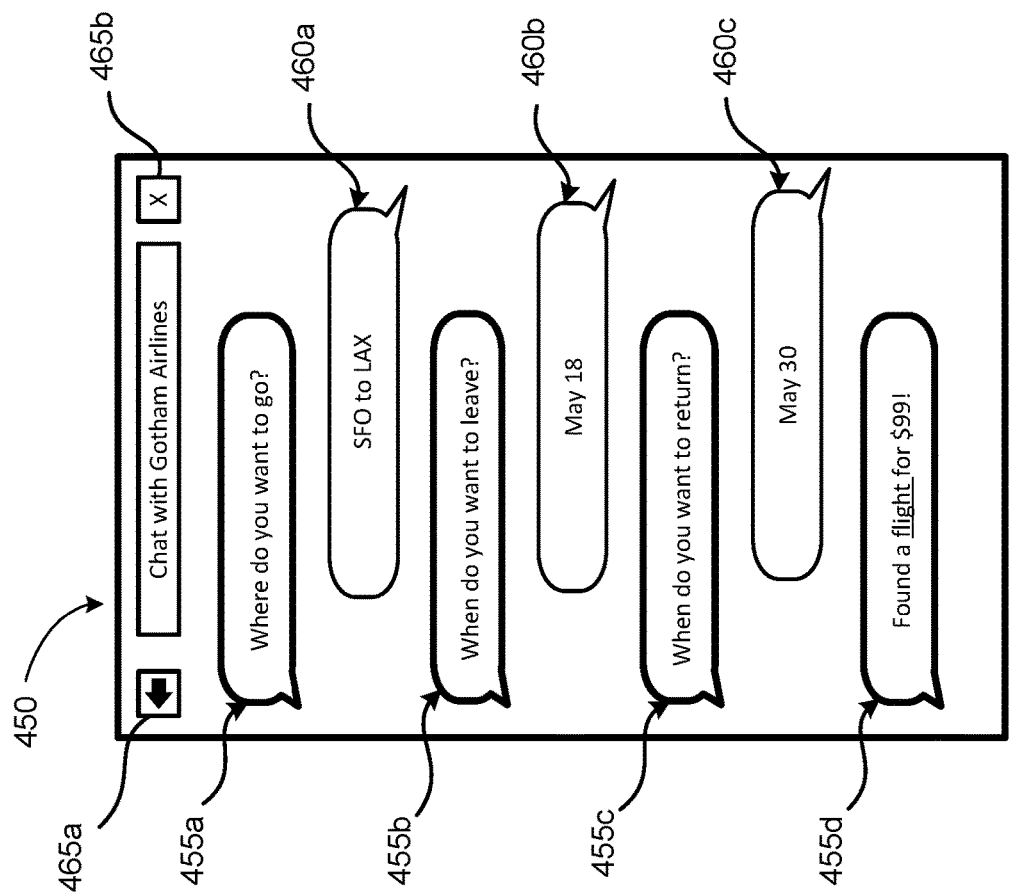
FIG. 4C illustrates a second example direct message interface, in accordance with an embodiment.

In a second example, responsive to interacting with the content item 405C, the third party system 130 sends a message 455a to a user prompting the user to provide information. The third party system 130 and the user can exchange a series of messages 455 and 460. To protect the privacy of the user, the messages sent between the user and the third party system are encrypted. As such, the online system in not able to access the content of the messages. The third party system 130 can respond to the user with a series of preset messages or may respond based on user responses. In one embodiment, shown in FIG. 4C, the success of the advertisement is based on whether deep conversation occurred. In the embodiment of FIG. 4C, deep conversation occurred (e.g., messages 445a-455c and 460a-460c). The online system 140 can determine whether deep conversation occurred using cryptic versions of the messages exchanged between the user and the advertiser, such that user privacy is protected. That is, although the messages are encrypted and the online system is unable to access the content of the messages, the online system can track the occurrence of a deep conversation by identifying the presence or absence of messages directed to each party. As such, the online system 140 may be able to count the number of messages exchanged between the advertiser and the user without accessing the message content.

The user interaction with the advertiser in the messaging application in the examples of FIG. 4B and FIG. 4C can be used to train the compatibility module 245. For example, where the compatibility score is a likelihood of deep conversation, in the example of FIG. 4B, the content item 405C may be included in a negative training set (i.e., because there was no deep conversation). Alternatively, the example of FIG. 4C, the content item 405C may be included in a positive training set (i.e., because the advertisement yielded deep conversation). In other embodiments, the advertisement may be included in a positive or negative training set based on whether the user interacts with the advertiser, whether the user responds to a message from the advertiser, whether the user clicks on a link to the advertiser's website, etc. The online system 140 can determine whether to include the content item in one or more training sets based on any suitable criteria. The online system 140 can store the training sets in the training data store 260.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by an online system from a content provider, a content item having a respective bid price, wherein the content item includes a link to initiate a direct message between a user of the online system and the content provider in a messaging application;
   receiving, by the online system, a request for content items from a target user of the online system;
   determining, by the online system using a trained model, a compatibility score for the content item and the target user based on one or more sets of criteria, wherein the one or more sets of criteria includes a first set of criteria indicating a compatibility between the target user and the messaging application, the trained model trained based on past interactions between users of the online system and content items presented to the users, and indications of whether the interactions between the users of the online system and the content items resulted in deep conversations;
   determining, by the online system, a subsidy for the content item based on the compatibility score;
   determining, by the online system, an auction price for the content item by adjusting the bid price with the determined subsidy; and
   including, by the online system, the content item with the determined auction price in one or more selection processes selecting content items for presentation to the target user of the online system.

2. The method of claim 1, wherein the first set of criteria includes at least one of: historical trends of interaction of the target user with the messaging application, feedback associated with the messaging application, characteristics of the target user, or historical trends of interaction of additional users of the online system with the messaging application.

3. The method of claim 1, wherein compatibility score is a likelihood of an exchange of three or more messages between the target user and the content provider in the messaging application.

4. The method of claim 1, wherein the one or more sets of criteria includes a second set of criteria indicating a compatibility between the user and the content provider, the second set of criteria including at least one of: historical interaction between the target user and the content provider, explicit preference by the target user for the content provider, implicit preference by the target user for the content provider, or purchasing history of the target user related to the content provider.

5. The method of claim 1, wherein the one or more sets of criteria includes a third set of criteria indicating a compatibility between the user and the content item, the third set of criteria including at least one of: targeting criteria associated with the content item, characteristics associated with the target user, or historical interaction between the user and different types of content items.

6. The method of claim 1, wherein determining the compatibility score comprises:
   weighting the one or more sets of criteria to generate a weighted compatibility score.

7. The method of claim 1, further comprising:
   selecting, by the one or more selection processes, the content item for presentation to the target user based on the auction price; and
   presenting the content item to the target user.

8. The method of claim 1, wherein the compatibility score is determined using a trained machine learning model trained at a determined frequency.

9. A system comprising:
   a processor; and
   a non-transitory computer readable storage medium having instructions encoded thereon that, when executed by the processor, cause the processor to:
   receive, by the system from a content provider, a content item having a respective bid price, wherein the content item includes a link to initiate a direct message between a user of the system and the content provider in a messaging application;
   receive, by the system, a request for content items from a target user of the system;
   determine, by the system using a trained model, a compatibility score for the content item and the target user based on one or more sets of criteria, wherein the one or more sets of criteria includes a first set of criteria indicating a compatibility between the target user and the messaging application, the trained model trained based on past interactions between users of the online system and content items presented to the users, and indications of whether the interactions between the users of the online system and the content items resulted in deep conversations;
   determine, by the system, a subsidy for the content item based on the compatibility score;
   determine, by the system, an auction price for the content item by adjusting the bid price with the determined subsidy; and
   include, by the system, the content item with the determined auction price in one or more selection processes selecting content items for presentation to the target user of the system.

10. The system of claim 9, wherein the first set of criteria includes at least one of: historical trends of interaction of the target user with the messaging application, feedback associated with the messaging application, characteristics of the target user, or historical trends of interaction of additional users of the system with the messaging application.

11. The system of claim 9, wherein the compatibility score is a likelihood of an exchange of three or more messages between the target user and the content provider in the messaging application.

12. The system of claim 9, wherein a second set of criteria in the one or more sets of criteria indicates a compatibility between the user and the content provider, the second set of criteria including at least one of: historical interaction between the target user and the content provider, explicit preference by the target user for the content provider, implicit preference by the target user for the content provider, or purchasing history of the target user related to the content provider.

13. The system of claim 9, wherein a third set of criteria in the one or more sets of criteria indicates a compatibility between the user and the content item, the third set of criteria including at least one of: targeting criteria associated with the content item, characteristics associated with the target user, or historical interaction between the user and different types of content items.

14. The system of claim 9, wherein determining the compatibility score comprises:
weighting the one or more sets of criteria to generate a weighted compatibility score.

15. The system of claim 9, wherein instructions further cause the processor to:
select, by the one or more selection processes, the content item for presentation to the target user based on the auction price; and
present the content item to the target user.

16. A non-transitory computer-readable storage medium having instructions encoded thereon that, when executed by a processor, cause the processor to:
receive, from a content provider, a content item having a respective bid price, wherein the content item includes a link to initiate a direct message between a user of an online system and the content provider in a messaging application;
receive a request for content items from a target user of the online system;
determine, using a trained model, a compatibility score for the content item and the target user based on one or more sets of criteria, wherein the one or more sets of criteria includes a first set of criteria indicating a compatibility between the target user and the messaging application, the trained model trained based on past interactions between users of the online system and content items presented to the users, and indications of whether the interactions between the users of the online system and the content items resulted in deep conversations;
determine a subsidy for the content item based on the compatibility score;
determine an auction price for the content item by adjusting the bid price with the determined subsidy; and
include the content item with the determined auction price in one or more selection processes selecting content items for presentation to the target user of the online system.

17. The non-transitory computer readable storage medium of claim 16, wherein the first set of criteria includes at least one of: historical trends of interaction of the target user with the messaging application, feedback associated with the messaging application, characteristics of the target user, or historical trends of interaction of other users of the online system with the messaging application.

18. The non-transitory computer readable storage medium of claim 16, wherein the compatibility score is a likelihood of an exchange of three or more messages between the target user and the content provider in the messaging application.

19. The non-transitory computer readable storage medium of claim 16, wherein a second set of criteria in the one or more sets of criteria indicates a compatibility between the user and the content provider, the second set of criteria including at least one of: historical interaction between the target user and the content provider, explicit preference by the target user for the content provider, implicit preference by the target user for the content provider, or purchasing history of the target user related to the content provider.

20. The non-transitory computer readable storage medium of claim 16, wherein determining the compatibility score comprises:
weighting the one or more sets of criteria to generate a weighted compatibility score.

* * * * *